(12) United States Patent
Xiao et al.

(10) Patent No.: US 8,271,780 B2
(45) Date of Patent: Sep. 18, 2012

(54) TRUSTED NETWORK CONNECT METHOD FOR ENHANCING SECURITY

(75) Inventors: Yuelei Xiao, Xi'an (CN); Jun Cao, Xi'an (CN); Xiaolong Lai, Xi'an (CN); Zhenhai Huang, Xi'an (CN)

(73) Assignee: China Iwncomm Co., Ltd (CN)

( * ) Notice: Subject to any disclaimer, the term of this patent is extended or adjusted under 35 U.S.C. 154(b) by 278 days.

(21) Appl. No.: 12/671,575

(22) PCT Filed: Jul. 21, 2008

(86) PCT No.: PCT/CN2008/071701

§ 371 (c)(1),
(2), (4) Date: Feb. 1, 2010

(87) PCT Pub. No.: WO2009/015580

PCT Pub. Date: Feb. 5, 2009

(65) Prior Publication Data

US 2011/0191579 A1   Aug. 4, 2011

(30) Foreign Application Priority Data

Aug. 1, 2007 (CN) .......................... 2007 1 0018396

(51) Int. Cl.
*H04L 9/00* (2006.01)
(52) U.S. Cl. ............ 713/156; 713/155; 713/168; 726/1; 726/2
(58) Field of Classification Search ................... 713/155, 713/156, 168, 169; 726/1, 2; 709/224, 229
See application file for complete search history.

(56) References Cited

U.S. PATENT DOCUMENTS

2002/0023212 A1* 2/2002 Proudler ....................... 713/164
2007/0143629 A1   6/2007 Hardjono et al.

FOREIGN PATENT DOCUMENTS

CN              1295753 A      5/2001
(Continued)

OTHER PUBLICATIONS

Trusted Computing Group, "TCG Trusted Network Connect TNC Architecture for Interoperability", Specification Version 1.2. Revision 4. May 21, 2007 pp. 11-19.

(Continued)

*Primary Examiner* — Kim Vu
*Assistant Examiner* — Baotran N To
(74) *Attorney, Agent, or Firm* — Cantor Colburn LLP

(57) ABSTRACT

A trusted network connect method for enhancing security, it pre-prepares platform integrity information, sets an integrity verify demand. A network access requestor initiates an access request, a network access authority starts a process for bi-directional user authentication, begins to perform the triplex element peer authentication protocol with a user authentication service unit. After the success of the bi-directional user authentication, a TNC server and a TNC client perform bi-directional platform integrity evaluation. The network access requestor and the network access authority control ports according to their respective recommendations, implement the mutual access control of the access requestor and the access authority. The present invention solves the technical problems in the background technologies: the security is lower relatively, the access requestor may be unable to verify the validity of the AIK credential and the platform integrity evaluation is not parity. The present invention may simplify the management of the key and the mechanism of integrity verification, expand the application scope of the trusted network connect.

10 Claims, 3 Drawing Sheets

FOREIGN PATENT DOCUMENTS

| | | |
|---|---|---|
| CN | 1426200 | 6/2003 |
| CN | 1741527 A | 3/2006 |
| CN | 1848722 A | 10/2006 |
| CN | 101159660 | 4/2007 |
| CN | 1996330 A | 7/2007 |
| CN | 101242266 | 8/2007 |
| CN | 10136928 | 3/2008 |
| CN | 101159640 A | 4/2008 |
| EP | 1182557 A2 | 2/2002 |
| RU | 2180987 C2 | 3/2002 |
| RU | 2300845 C2 | 6/2007 |
| WO | 2004/043006 A1 | 5/2004 |

OTHER PUBLICATIONS

Decision on Grant of a Patent for Invention for Russian Application 22010106634, dated Jun. 24, 2011, with English translation.

Extended European Search Report for Application No./Patent No. 08773226.9-2413/2184886 dated Nov. 4, 2011.

TCG Trusted Network Connect TNC Architecture for Interoperability, Specification Version 1.1, Revision 2, May 1, 2006, pp. 1-40.

TCG Trusted Network Connect TNC Architecture for Interoperability, Specification Version 12, Revision 4, May 21, 2007, pp. 1-41.

International Search Report PCT/CN2008/071701; Dated Oct. 30, 2008.

* cited by examiner

TRUSTED NETWORK CONNECT METHOD FOR ENHANCING SECURITY

The present application claims priority to Chinese Patent Application No. 200710018396.2, entitled "TRUSTED NETWORK CONNECT METHOD FOR ENHANCING SECURITY", filed with Chinese Patent Office on Aug. 1, 2007, which is incorporated herein in its entirety.

FIELD OF THE INVENTION

The present invention relates to the technical field of network security, and particularly to a trusted network connect method for enhancing security.

BACKGROUND OF THE INVENTION

With the development of informanization, the issues of malicious software such as virus and worms become very serious. At present, there have been over thirty-five thousand kinds of malicious software, and over forty million computers are infected every year. In order to astrict such attacks, not only secure transmission and check for data input need to be performed, but also defence should be performed from the source, i.e., each terminal connected to the network. However, conventional secure defence technologies can not defense various kinds of malicious attacks.

In view of this, the international Trusted Computing Group (TCG) has specially specified a network connect specification based on trusted computing technology—Trusted Network Connect (TNC), abbreviated as TCG-TNC. The TCG-TNC includes an open terminal integrity architecture and a set of standards for ensuring secure interoperation. The set of standards can protect a network to some extent as a user requires and customizes. The essential of the TCG-TNC is to set up a connection from the terminal integrity. First, a set of policies for operating in an internal system of the trusted network is created. Only terminals complying with the policies set by the network can access the network. The network isolates and locates those devices that do not comply with the policies. Due to the use of a Trusted Platform Module (TPM), an attack from root kits can be prevented further. Root bits is an attack script, a modified system program, or a whole set of attack scripts and tools, and is configured to obtain the highest control right of a target system illegally in the target system.

With the conventional TCG-TNC architecture, a procedure of information transmission over an overall the trusted network connection is as follows: before a network connection is set up, the TNC client needs to prepare required platform integrity information and to provide the required platform integrity information to the IMC. In a terminal including a trusted platform module, platform information required by network policies is hashed and stored in respective platform configuration registers (PCRs). The TNC Server needs to pre-specify verification requirements for the platform integrity and provides the verification requirements to the IMV. A detailed procedure is as follows:

(1) The network access requestor initiates an access request to the policy enforcer.

(2) The policy enforcer sends an access request description to a network access authority.

(3) The network access authority and the network access requestor perform a user authentication protocol on receiving the access request description from the network access requestor. If the user authentication is successful, the network access authority sends the access request and user authentication success information to the TNC server.

(4) The TNC server and the TNC client perform mutual platform credential authentication, e.g., verifying an Attestation Identity Key (AIK) of the platform, on receiving the access request and the user authentication success information from the network access authority.

(5) If the platform credential authentication is successful, the TNC client informs the IMC that a new network connection is initiated and an integrity handshake protocol should be performed. The IMC returns required platform integrity information via the IF-IMC interface. The TNC server sends the platform integrity information to the IMV via the IF-IMV interface.

(6) In a procedure of performing the integrity handshake protocol, the TNC client and the TNC server exchange data for one or more times until the TNC server is satisfied.

(7) When the TNC server accomplishes the integrity handshake protocol to the TNC client, the TNC server sends a recommendation letter to the network access authority to request for an access. In other consideration of securities, the policy decision point can still not allow the access of the access requestor.

(8) The network access authority transfers an access decision to the policy enforcer, which ultimately performs the decision to control the access of the access requestor.

At present, there is no mature TCG-TNC hierarchical product into the market. Some important technologies of the TCG-TNC architecture is still under research and specification and have the following disadvantages:

1. Bad extensibility. There are pre-defined secure channels between the policy enforcement point and the policy decision point and the policy decision point may possibly manage a plurality of policy enforcement points, which forces the policy decision point to configure a plurality of secure channels, thereby resulting in complexity of management. Therefore, the extensibility is bad.

2. Complex key negotiation procedure. Because security protection should be performed on data above the network access layer, secure channels need to be set up between the access requestor and the policy decision point, i.e., a session key negotiation is performed between them. However, data protection is also required between the access requestor and the policy enforcement point, a second session key negotiation is performed between the access requestor and the policy enforcement point, which makes the key negotiation procedure complex.

3. Relative poor security. A primary key negotiated between the access requestor and the policy decision point is transferred to the policy enforcement point by the policy decision point. The key is transferred over the network, which introduces new security attack points and reduces security. In addition, the same primary key is used in the two session key negotiations, which reduces the security of the whole trusted network connect architecture.

4. The access requestor possibly can not validate the AIK certificate of the policy decision point. In the procedure of platform credential authentication, the access requestor and the policy decision point utilize an AIK private key and certificate to perform the mutual platform credential authentication. Both of the access requestor and the policy decision point need to validate the AIK certificate. If the policy decision point is an on-line service provider of the access requestor, the access requestor can not access the network before a trusted network connection, i.e., can not validate the AIK certificate of the policy decision point, which results in insecurity.

5. Platform integrity evaluation is not peer-to-peer. In the TCG-TNC architecture, the policy decision point performs evaluation of platform integrity on the access requestor, however, the access requestor does not perform evaluation of platform integrity on the policy decision point. If the platform of the policy decision point is not trusted, it is insecure if the access requestor is connected to such an trusted device. However, peer trust is indispensable in a Ad hoc network.

SUMMARY OF THE INVENTION

The present invention provides a trusted network connect method for enhancing security, which can solve the technical problem of relative low security and the problems that the access requestor may fail to validate the AIK certificate and that platform integrity evaluation is not peer-to-peer in the background art.

The present invention provides the following technical solutions.

A trusted network connect method for enhancing security, including:

(1.) an initiation step:

(1.1) a TNC client of an access requestor and a TNC server of an access authority prepare in advance platform integrity information and provides the platform integrity information to respective Integrity Measurement Collecters (IMCs) of an integrity measurement layer;

(1.2) the TNC client and the TNC server pre-specify integrity verification requirements, which include PCRs tables to be requested mutually for verification by the access requestor and the access authority;

(1.3) the Trusted Platform Modules (TPMs) of the access requestor and the access authority hash platform information required by network policies and store the hashed platform information in Platform Configuration Registers (PCRs);

(2.) a user authentication:

(2.1) at a network access layer, a network access requestor initiates an access request to a policy enforcer, which forwards the access request to a network access authority;

(2.2) the network access authority initiates a bidirectional user authentication procedure on receiving the access request, a tri-element peer authentication protocol is performed among the network access requestor, the network access authority and a user authentication service unit of the network access layer to implement bidirectional user authentication and key negotiation between the access requestor and the access authority; then, the network access authority transmits a primary key generated in the bidirectional user authentication procedure to a policy enforcement point via a pre-established secure channel; finally, the policy enforcement point and the access requestor utilize the primary key to perform key negotiation;

(2.3) if the bidirectional user authentication is successful, the network access requestor and the network access authority send user authentication success information to the TNC client and the TNC server of an integrity evaluation layer.

(3.) an integrity evaluation step:

when the TNC server of the access authority receives the user authentication success information sent from the network access authority, the TNC server of the access authority, the TNC client of the access requestor and a platform evaluation service unit of the policy manager utilize the tri-element peer authentication protocol to implement bidirection platform integrity evaluation between the access requestor and the access authority at the integrity evaluation layer and the integrity measurement layer;

(4.) an access control step:

the TNC server and the TNC client respectively collect platform integrity evaluation results of the access authority and the access requestor, and send recommendations to the network access authority and the network access requestor respectively; the network access requestor and the network access authority respectively control ports according to the received recommendations to implement mutual access control between the access requestor and the access authority.

Preferably, in the step (3.) the TNC server of the access authority, the TNC client of the access requestor and a platform evaluation service unit of the policy manager utilize the tri-element peer authentication protocol to implement bidirectional platform integrity evaluation between the access requestor and the access authority, manners for implementing the platform integrity evaluation include:

the access requestor verifies the platform integrity of the access authority, and the access authority verifies the integrity of the access requestor; and the policy manager validates AIK certificates of the access requestor and the access authority.

Preferably, in the step (3.) the TNC server of the access authority, the TNC client of the access requestor and a platform evaluation service unit of the policy manager utilize the tri-element peer authentication protocol to implement bidirection platform integrity evaluation between the access requestor and the access authority, manners for implementing the platform integrity evaluation include:

(3.1.1) when the TNC server of the access authority receives the user authentication success information sent from the network access authority or the user authentication has been confirmed as successful, the access authority sends the following information to the access requestor:

(a) a random number generated by TPM of the access authority ($N_S$); (b) an AIK certificate of the access authority ($Cert_{AC-AIK}$); and (c) a PCRs table requested from the access requestor by the access authority ($PCRsList_{AR}$);

(3.1.2) on receiving the information sent from the access authority in the step (3.1.1), the access requestor extracts from the TPM a corresponding PCRs value according to the PCRs table requested by the access authority, signs the corresponding PCRs value extrated from the TPM and the $N_S$ in the TPM by utilizing an AIK private key, and sends the following information to the access authority:

(a) a random number generated by TPM of the access authority ($N_S$); (b) a random number generated by TPM of the access requestor ($N_{AR}$); (c) an AIK certificate of the access requestor ($Cert_{AR-AIK}$); (d) a PCRs table requested from the access authority by the access requestor ($PCRsList_{AC}$); (e) a PCRs value requested by the access authority ($PCRs_{AR}$); (f) a measurement log of the PCRs value requested by the access authority ($Log_{AR}$); and (g) a signature, which is signed by the access requestor in the TPM, of the corresponding PCRs value extrated from the TPM and the $N_S$ by utilizing the AIK private key;

(3.1.3) on receiving the information sent from the access requestor in the step (3.1.2), the access authority instructs the TPM to verify the consistency of the random numbers generated by the TPM of the access authority ($N_S$), then validates the AIK signature of the access requestor by utilizing a public key of the AIK certificate of the access requestor, verifies platform integrity of the access requestor by utilizing the PCRs value requested from the access requestor by the access authority, the $Log_{AR}$ and a standard integrity measurement value provided in a database, generates a platform integrity verification result of the access requestor by the access authority, and sends the following information to the policy manager:

(a) a random number generated by TPM of the access requestor ($N_{AR}$); (b) a random number generated by an access authority user ($N_{AC}$); (c) the AIK certificate of the access requestor; and (d) the AIK certificate of the access authority;

(3.1.4) on receiving the information sent from the access authority in the step (3.1.3), the policy manager verifies the AIK certificates of the access requestor and the access authority and generates a result of verification of certificates of the access requestor and the access authority (Result$_{AIK}$), the Result$_{AIK}$ including the $N_{AC}$, the Cert$_{AR\text{-}AIK}$, a result of verification of the AIK certificate of the access requestor (Re$_{AC\text{-}AIK}$), a random number generated by TPM of the access requestor ($N_{AR}$), the Cert$_{AC\text{-}AIK}$, a result of verification of the AIK certificate of the access authority (Re$_{AC\text{-}AIK}$) the policy manager signs the Result$_{AIK}$ by utilizing a private key corresponding to the identity certificate of the policy manager; the policy manager sends the generated Result$_{AIK}$ and the signature [Result$_{AIK}$]$_{Sig}$ of the Result$_{AIK}$ to the access authority;

(3.1.5) on receiving the information sent from the policy manager in the step (3.1.4), the access authority verifies the consistency of the random numbers generated by an access authority user ($N_{AC}$) and the random numbers generated by TPM of the access requestor ($N_{AR}$), and validates the signature of the policy manager by utilizing a public key corresponding to the identity certificate of the policy manager; the access authority validates the AIK certificate of the access requestor according to the certificate verification result, and generates a platform integrity evaluation result by utilizing the platform integrity verification result of the access requestor performed by the access authority; the access authority extracts from the TPM a corresponding PCRs value according to the PCRs table requested by the access requestor, and signs in the TPM the corresponding PCRs value extracted from the TPM and the $N_{AR}$ by utilizing an AIK private key; the access authority sends the following information to the access requestor:

(a) a message content sent by the policy manager in the step (3.1.4); (b) a random number generated by TPM of the access requestor ($N_{AR}$); (c) a random number generated by an access authority user ($N_{AC}$); (d) the PCRs value requested by the access requestor (PCRs$_{AC}$); (e) a measurement log of the PCRs value requested by the access requestor (Log$_{AC}$); and (f) the signature, which is signed by the access authority, of the corresponding PCRs value extracted from the TPM and the $N_{AR}$;

(3.1.6) on receiving the information sent from the access authority in the step (3.1.5), the access requestor validates the signature of the policy manager by utilizing a public key corresponding to the identity certificate of the policy manager, verifies the consistency of the random numbers generated by TPM of the access requestor ($N_{AR}$), validates the AIK signature of the access authority by utilizing a public key of the AIK certificate of the access authority, and validates the AIK certificate of the access authority according to a certificate verification result; the access requestor verifies the platform integrity of the access authority by utilizing the PCRs value requested from the access authority by the access requestor, the Log$_{AC}$ and the standard integrity measurement value provided in the database, and generates a platform integrity verification result of the access authority; the access requestor generates a platform integrity evaluation result according to the validity of the AIK certificate of the access authority and the platform integrity verification result of the access authority.

Preferably, in the procedure of generating the platform integrity evaluation result of the access requestor in the step (3.1.5), the access authority exchanges integrity information with the access requestor by repeating the step (3.1.1) to the step (3.1.6).

Preferably, in the procedure of generating the platform integrity evaluation result of the access authority in the step (3.1.6), the access requestor exchanges integrity information with the access authority by repeating the step (3.1.2) to the step (3.1.6).

Preferably, in the step (3.) the TNC server of the access authority, the TNC client of the access requestor and a platform evaluation service unit of the policy manager utilize the tri-element peer authentication protocol to implement bidirectional platform integrity evaluation between the access requestor and the access authority, manners for implementing the platform integrity evaluation include:

the policy manager verifies the platform integrity of the access requestor and the access authority; and the policy manager validates AIK certificates of the access requestor and the access authority.

Preferably, in the step (3.) the TNC server of the access authority, the TNC client of the access requestor and a platform evaluation service unit of the policy manager utilize the tri-element peer authentication protocol to implement bidirectional platform integrity evaluation between the access requestor and the access authority, manners for implementing the platform integrity evaluation include:

(3.2.1) on receiving the user authentication success information sent from the network access authority, the access authority sends the following information to the access requestor:

(a) a random number generated by TPM of the access authority ($N_S$); (b) an AIK certificate of the access authority (Cert$_{AC\text{-}AIK}$); and (c) a PCRs table requested from the access requestor by the access authority (PCRsList$_{AR}$);

(3.2.2) on receiving the information sent from the access authority in the step (3.2.1), the access requestor extracts from the TPM a corresponding PCRs value according to the PCRs table requested by the access authority, signs in the TPM the corresponding PCRs value extrated from the TPM and the $N_S$ by utilizing an AIK private key, and sends the following information to the access authority:

(a) a random number generated by TPM of the access authority ($N_S$); (b) a random number generated by TPM of the access requestor ($N_{AR}$); (c) an AIK certificate of the access requestor (Cert$_{AR\text{-}AIK}$); (d) a PCRs table requested from the access authority by the access requestor (PCRsList$_{AC}$); (e) a PCRs value requested by the access authority (PCRs$_{AR}$); (f) a measurement log of the PCRs value requested by the access authority (Log$_{AR}$); and (g) a signature, which is signed by the access requestor in the TPM, of the corresponding PCRs value extrated from the TPM and the $N_S$ by utilizing the AIK private key;

(3.2.3) on receiving the information sent from the access requestor in the step (3.2.2), the access authority instructs the TPM to verify the consistency of the random numbers generated by the TPM of the access authority ($N_S$), validates the AIK signature of the access requestor by utilizing a public key of the AIK certificate of the access requestor, and extracts from the TPM a corresponding PCRs value according to the PCRs table requested by the access requestor; the access authority signs the corresponding PCRs value extracted from the TPM and the $N_{AR}$ in the TPM by utilizing an AIK private key, and sends the following information to the policy manager:

(a) a random number generated by TPM of the access authority ($N_S$); (b) a random number generated by TPM of the access requestor ($N_{AR}$); (c) the AIK certificate of the access requestor (Cert$_{AR\text{-}AIK}$); (d) the PCRs value requested by the access authority (PCRs$_{AR}$); (e) the measurement log of the PCRs value requested by the access authority (Log$_{AR}$); (f) the signature, which is signed in the TPM by the access requestor, of the corresponding PCRs value extracted from the TPM and the $N_S$ by utilizing the AIK private key; (g) a random number generated by an access authority user ($N_{AC}$); (h) the AIK certificate of the access authority (Cert$_{AC-AIK}$); (i) a PCRs value requested by the access requestor (PCRs$_{AC}$); (j) a measurement log of the PCRs value requested by the access requestor (Log$_{AC}$); and (k) the signature, which is signed in the TPM by the access authority, of the corresponding PCRs value extracted from the TPM and the $N_{AR}$ by utilizing the AIK private key;

(3.2.4) on receiving the information sent from the access authority in the step (3.2.3), the policy manager validates the AIK signatures of the access requestor and the access authority by utilizing public keys corresponding to respective AIK certificates of the access requestor and the access authority; the policy manager re-computes a corresponding PCRs value according to the measurement logs of the corresponding PCRs values extracted from the respective TPMs of the access requestor and the access authority as well as a standard integrity measurement value in a database, and compares the re-computed corresponding PCRs value with the corresponding PCRs value in the information sent from the access authority in the step (3.2.3); the policy manager generates a result of AIK certificate authentication and integrity verification of the access requestor and the access authority (Result$_{AIK-PCRs}$), and signs the Result$_{AIK-PCRs}$ by utilizing a private key corresponding to the identity certificate of the policy manager to obtain a [Result$_{AIK-PCRs}$]$_{Sig}$; the policy manager sends the Result$_{AIK-PCRs}$ and the [Result$_{AIK-PCRs}$]$_{Sig}$ to the access authority, the Result$_{AIK-PCRs}$ including:

(a) a random number generated by the access authority user ($N_{AC}$); (b) a random number generated by TPM of the access authority ($N_S$); (c) the AIK certificate of the access requestor (Cert$_{AR-AIK}$); (d) the PCRs value requested by the access authority (PCRs$_{AR}$); (e) a result of platform integrity verification of the access requestor (Re$_{AR}$); (f) a random number generated by TPM of the access requestor ($N_{AR}$); (g) the AIK certificate of the access authority (Cert$_{AC-AIK}$); (h) the PCRs value requested by the access requestor (PCRs$_{AC}$); (i) a result of platform integrity verification of the access authority (Re$_{AC}$); (j) a result of verification of AIK certificate of the access requestor (Re$_{AR-AIK}$); and (k) a result of verification of AIK certificate of the access authority (Re$_{AC-AIK}$);

(3.2.5) on receiving the information sent from the policy manager in the step (3.2.4), the access authority verifies the consistency of a random number generated by the access authority user ($N_{AC}$) and the $N_{AC}$ in the information sent by the policy manager in the step (3.2.4), and validates the user signature of the policy manager; the access authority instructs the TPM to verify the consistency of the random numbers generated by TPM of the access authority ($N_S$), the consistency of the AIK certificates of the access requestor (Cert$_{AR-AIK}$) and the consistency of the PCRs values requested by the access authority (PCRs$_{AR}$); the access authority verifies the Re$_{AR-AIK}$ and the Re$_{AR}$, and generates a platform integrity evaluation result of the access requestor; the access authority sends to the access requestor the information in the step (3.2.4) and the signature of the PCRs value extracted from the TPM and the $N_{AR}$ by the access authority utilizing an AIK private key in the TPM;

(3.2.6) on receiving the information sent from the access authority in the step (3.2.5), the access requestor validates the AIK signature of the access authority and the validity of the user signature of the policy manager; the access requestor instructs the TPM to verify the consistency of the random numbers generated by TPM of the access requestor ($N_{AR}$); the access requestor verifies the consistency of the AIK certificate of the access authority and the PCRs value requested by the access requestor; the access requestor verifies the Re$_{AC-AIK}$ and the Re$_{AC}$, and generates a platform integrity evaluation result of the access requestor.

Preferably, in the procedure of generating the platform integrity evaluation result of the access requestor in the step (3.2.5), the access authority exchanges integrity information with the access requestor again by repeating the step (3.2.1) to the step (3.2.6).

Preferably, in the procedure of generating the platform integrity evaluation result of the access authority in the step (3.2.6), the access requestor exchanges integrity information with the access authority again by repeating the step (3.2.2) to the step (3.2.6).

Preferably, the recommendation sent by the TNC server and the TNC client to the network access authority and the network access requestor includes: access permission information, access refusal information and isolation repair information.

As can be seen from the above technical solutions of the present invention, the access control method based on tri-element peer authentication protocol is adopted at the network access layer, which enhances the security of the trusted network connect architecture and simplifies key management of the architecture.

In addition, a manner of implementing the platform integrity evaluation may be selected according to actual situation. In the first manner, the policy manager implements concentrated authentication of AIK certificates of the access requestor and the access authority, and the access requestor and the access authority implement platform integrity verification of the other part locally each other. The first manner is adapted if both the access requestor and the access authority can access a database storing standard integrity measurement values of respective platform components, which can enhance the security of the trusted network connect architecture and simplify key management of the trusted network connect architecture. In the second manner, both authentication of AIK certificates and platform integrity verification of the access requestor and the access authority are accomplished by the policy manager, which simplifies key management and integrity verification mechanisms of the trusted network connect architecture, further enhances the security of the trusted network connect architecture and extenses the application range of the trusted network connect.

In addition, in the present invention, the tri-element peer authentication protocol, i.e., bidirectional authentication protocol based on a third party, is adopted not only at the network access layer to implement bidirectional user authentication between the access requestor and the access authority but also at the integrity evaluation layer to implement bidirectional platform integrity evaluation between the access requestor and the access authority, thereby enhancing the security of the whole trusted network connect architecture.

Figure 1:
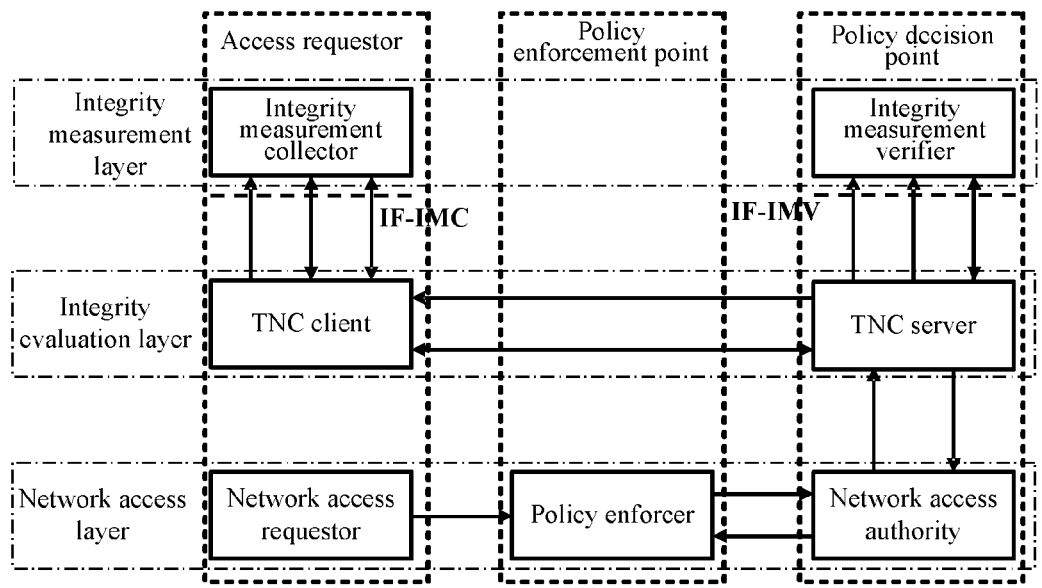
FIG. 1 is a schematic diagram of a whole information transmission over a trusted network connection in the conventional TCG-TNC architecture.

Reference signs are denoted as follows:

$N_s$: A random number generated by Trusted Platform Module (TPM) of access authority; $Cert_{AC-AIK}$: An AIK certificate of access authority; $PCRsList_{AR}$: A PCRs table requested from access requestor by access authority; $N_{AR}$: A random number generated by Trusted Platform Module (TPM) of access requestor; $Cert_{AR-AIK}$: An AIK certificate of access requestor; $PCRsList_{AC}$: A PCRs table requested from access authority by access requestor; $Log_{AR}$: Measurement log of PCRs value requested by access authority; $PCRs_{AR}$:

PCRs value requested by access authority; $[N_S, PCRs_{AR}]_{Sig}$: Signature, by access requestor, of the random number generated by Trusted Platform Module (TPM) of access authority and PCRs value requested by access authority; $N_{AC}$: A random number generated by access authority user; $Log_{AC}$: Measurement log of PCRs value requested by access requestor; $PCRs_{AC}$: PCRs value requested by access requestor; $[N_{AR}, PCRs_{AC}]_{Sig}$: Signature, by access authority, of the random number generated by Trusted Platform Module (TPM) of access requestor and PCRs value requested by access requestor; $Result_{AIK-PCRs}$: Results of AIK certificate authentication and integrity verification of access requestor and access authority; $[Result_{AIK-PCRs}]_{Sig}$: Signature, by policy manager, of results of AIK certificate authentication and integrity verification of access requestor and access authority; $Re_{AC}$: Result of platform integrity verification to access authority; $Re_{AR}$: Result of platform integrity verification of access requestor; $Result_{AIK}$: Result of verification of AIK certificates of access requestor and access authority; $[Result_{AIK}]_{Sig}$: Signature, by policy manager, of result of verification of AIK certificates of access requestor and access authority; $Re_{AR-AIK}$: Result of verification of AIK certificate of access requestor; $Re_{AC-AIK}$:

Result of verification of AIK certificate of access authority.

DETAILED DESCRIPTION OF THE INVENTION

Most of conventional networks, especially wired networks, are deployed in a TCG-TNC architecture. The present invention provides a trusted network connect architecture for enhancing security over the TCG-TNC architecture. The present invention mainly includes a network access layer, an integrity evaluation layer and an integrity measurement layer. Four logic entities of an access requestor, a policy enforcement point, an access authority and a policy manager may be distributed in any position of the network. The access requestor is also called a requestor, a user station, etc. The policy manager is also called an authentication server, a trusted server, a background server, etc.

The network access layer is responsible for implementing bidirectional user authentication and key negotiation between the access requestor and the access authority, key negotiation between the access requestor and the policy enforcement point, and mutual access control between the access authority and the access requestor. Detailed implementing steps are described as follows: first, it is assumed that a secure channel is pre-established between the policy enforcement point and the access authority. Then, a network access requestor, a network access authority and a user authentication service unit performs a tri-element peer authentication protocol to implement the bidirectional user authentication and key negotiation between the access requestor and the access authority. A primary key generated in the authentication procedure is transmitted by the network access authority to the policy enforcement point via the secure channel. Finally, the policy enforcement point utilizes the primary key to perform key negotiation with the access requestor, to ensure the security of data transmission between the policy enforcement point and the access requestor. The network access layer according to the present invention may adopt an access control method based on tri-element peer authentication, i.e., a network access control technique adopted in Chinese WLAN standard.

The integrity evaluation layer is responsible for implementing platform integrity evaluation of the access requestor and the access authority, including platform credential authentication and platform integrity verification. The platform integrity evaluation may be implemented in the following two manners.

Figure 2:
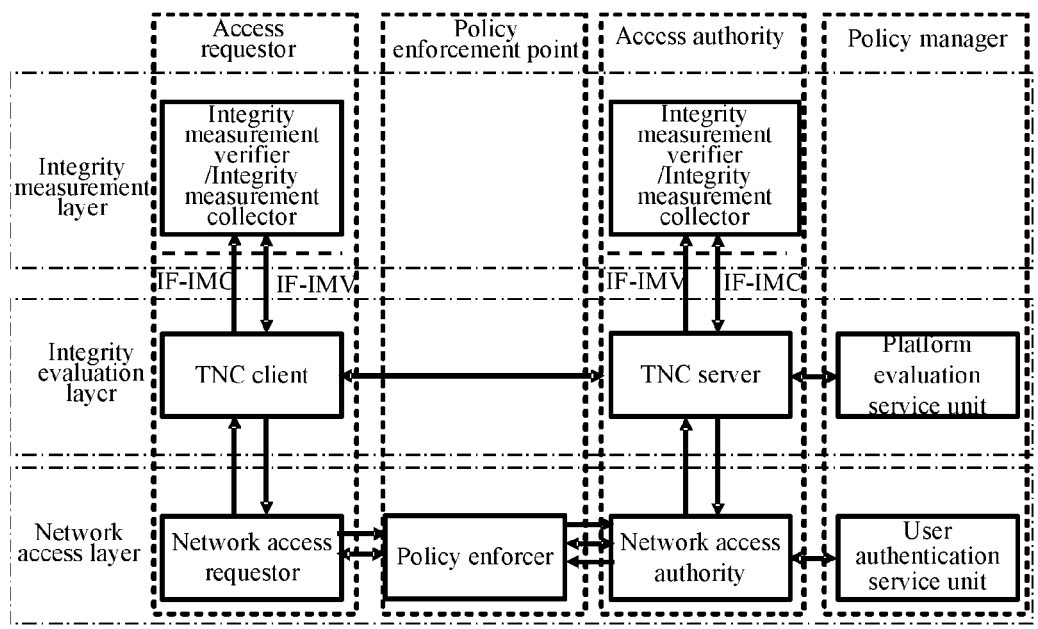
FIG. 2 is a schematic diagram of a whole information transmission in a first platform integrity evaluation manner according to the present invention.

The first platform integrity evaluation manner is illustrated in FIG. 2. The policy manager validates AIK certificates of the access requestor and the access authority. The access requestor and the access authority verifies the integrity of platform of the other part locally each other. This manner is adapted if both the access requestor and the access authority can access a database storing standard integrity measurement values of respective platform components, which can enhance the security of the trusted network connect architecture and simplify key management of the trusted network connect architecture. The platform integrity verification and the platform credential authentication are implemented as follows:

①. The platform integrity verification: The platform integrity verification of the access authority is performed at the TNC client, and the platform integrity verification of the access requestor is performed at the TNC server.

②. The platform credential authentication: The platform credential authentication of the access requestor and the access authority is implemented through a tri-element peer authentication protocol. The authentication of AIK certificates of the access requestor and an access controller is accomplished by a platform evaluation service unit.

Figure 3:
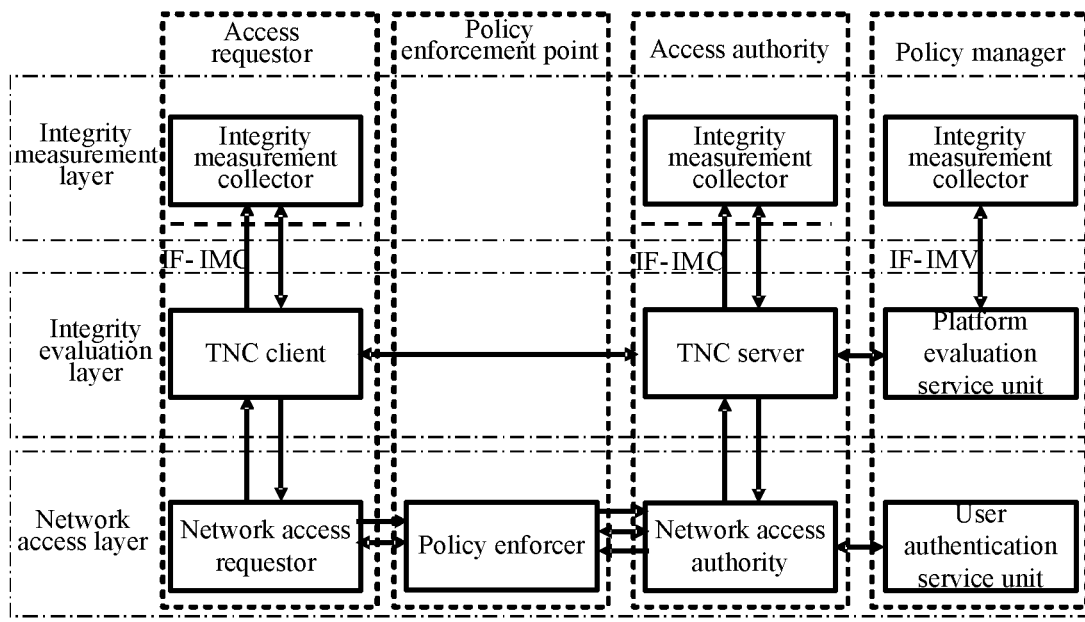
FIG. 3 is a schematic diagram of a whole information transmission in a second platform integrity evaluation manner according to the present invention.

The second platform integrity evaluation manner is illustrated in FIG. 3. Validity verification of AIK certificates and platform integrity verification of the access requestor and the access authority are accomplished by the policy manager, which simplifies key management and integrity verification mechanisms of the trusted network connect architecture, further enhances the security of the trusted network connect architecture and extenses the application range of the trusted network connect. The platform integrity verification and the platform credential authentication are implemented as follows:

①. The platform integrity verification: The platform integrity verification of both the access requestor and the access authority are accomplished by the platform evaluation service unit.

②. The platform credential authentication: The platform credential authentication of the access requestor and the access authority is implemented through a tri-element peer authentication protocol. The validity verification of AIK certificates of the access requestor and an access authority are accomplished by the platform evaluation service unit.

The integrity measurement layer is responsible for collecting and verifying platform integrity information of the access requestor and the access authority. In the first platform integrity evaluation manner, both the access requestor and the access authority collect the platform integrity information and verify the platform integrity information. In the second platform integrity evaluation manner, both the access requestor and the access authority only collect the platform integrity information, and verification of the platform integrity information is implemented by the policy manager.

The present invention includes the following steps:

(1.) Initiation is performed. Before a network connection is set up, the following steps are performed:

(1.1) The TNC client of the access requestor and the TNC server of the access authority prepare in advance platform integrity information and provides the platform integrity information to respective Integrity Measurement Collecters (IMCs) of the integrity measurement layer.

(1.2) The TNC client and the TNC server pre-specify integrity verification requirements, which include PCRs tables to be requested mutually for verification by the access requestor and the access authority. In the first platform integrity evaluation manner, the TNC client and the TNC server provide the pre-specified integrity verification requirements to the IMVs of the access requestor and the access authority directly. In the second platform integrity evaluation manner, the TNC client and the TNC server provide the pre-specified integrity verification requirements to the IMV of the policy manager only in the platform integrity evaluation procedure.

(1.3) The TPMs of the access requestor and the access authority hash platform information required by network policies and store the hashed platform information in the PCRs.

(2.) User authentication is performed.

(2.1) At the network access layer, a network access requestor initiates an access request to the policy enforcer, which forwards the access request to a network access authority.

(2.2) The network access authority initiates a bidirectional user authentication procedure on receiving the access request. A tri-element peer authentication protocol is performed among the network access requestor, the network access authority and the user authentication service unit of the network access layer, to implement bidirectional user authentication and key negotiation between the access requestor and the access authority. Then, the network access authority transmits a primary key generated in the bidirectional user authentication procedure to the policy enforcement point via the pre-established secure channel. Finally, the policy enforcement point and the access requestor utilize the primary key to perform key negotiation.

(2.3) If the bidirectional user authentication is successful, the network access requestor and the network access authority send user authentication success information to the TNC client and the TNC server of the integrity evaluation layer.

(3.) Integrity evaluation is performed.

When the TNC server of the access authority receives the user authentication success information sent from the network access authority, the TNC server of the access authority, the TNC client of the access requestor and the platform evaluation service unit of the policy manager utilize a tri-element peer authentication protocol to implement bidirection platform integrity evaluation between the access requestor and the access authority at the integrity evaluation layer and the integrity measurement layer. In the platform integrity evaluation procedure, one or more data exchange may be required.

Figure 4:
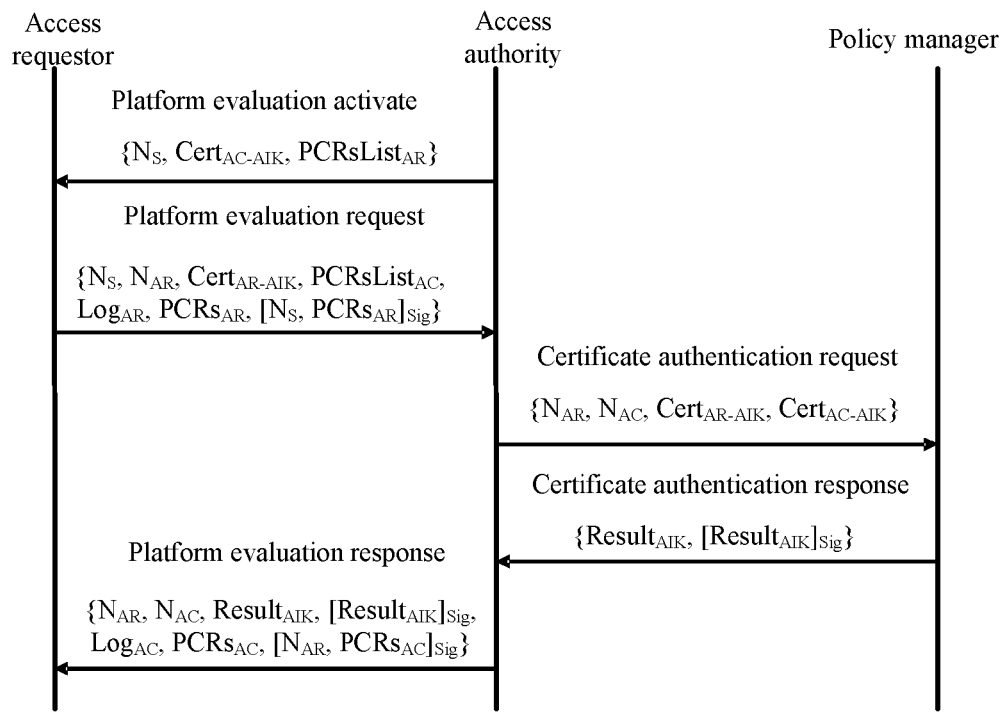
FIG. 4 is a schematic diagram of a first manner of implementing platform integrity evaluation according to the present invention.

Referring to FIG. 4, the first manner of implementing the platform integrity evaluation is as follows:

(3.1.1) When the TNC server of the access authority receives the user authentication success information sent from the network access authority or the user authentication has been confirmed as successful, the access authority sends the following information to the access requestor:

(a) $N_S$; (b) $Cert_{AC\text{-}AIK}$; (c) $PCRsList_{AR}$.

(3.1.2) On receiving the information sent from the access authority in the step (3.1.1), the access requestor first extracts from the TPM a corresponding PCRs value according to the PCRs table requested by the access authority, then signs the corresponding PCRs value extrated from the TPM and the $N_S$ in the TPM by utilizing an AIK private key, and finally sends the following information to the access authority:

(a) $N_S$; (b) $N_{AR}$; (c) $Cert_{AR\text{-}AIK}$; (d) $PCRsList_{AC}$; (e) $PCRs_{AR}$; (f) $Log_{AR}$; and (g) Signature, which is signed by the access requestor, of the corresponding PCRs value extrated from the TPM and the $N_S$ in the TPM by utilizing the AIK private key.

(3.1.3) On receiving the information sent from the access requestor in the step (3.1.2), the access authority first instructs the TPM to verify the consistency of the random numbers generated by TPM of the access authority, $N_S$, then validates the AIK signature of the access requestor by utilizing a public key of the AIK certificate of the access requestor, subsequently verifies the platform integrity of the access requestor by utilizing the PCRs value requested from the access requestor by the access authority, $Log_{AR}$ and a standard integrity measurement value provided in the database and generates a platform integrity verification result of the access requestor by the access authority, and finally sends the following information to the policy manager:

(a) $N_{AR}$; (b) $N_{AC}$; (c) the AIK certificate of the access requestor; and (d) the AIK certificate of the access authority.

(3.1.4) On receiving the information sent from the access authority in the step (3.1.3), the policy manager first verifies the AIK certificates of the access requestor and the access authority and generates a $Result_{AIK}$, the $Result_{AIK}$ including $N_{AC}$, $Cert_{AR\text{-}AIK}$, $Re_{AR\text{-}AIK}$, $N_{AR}$, $Cert_{AC\text{-}AIK}$, $Re_{AC\text{-}AIK}$; then, the policy manager signs the certificate verification result by utilizing a private key corresponding to the identity certificate of the policy manager; finally, the policy manager sends the generated $Result_{AIK}$ and the $[Result_{AIK}]_{Sig}$ to the access authority.

(3.1.5) On receiving the information sent from the policy manager in the step (3.1.4), the access authority first verifies the consistency of $N_{AC}$ and $N_{AR}$, and validates the signature of the policy manager by utilizing a public key corresponding to the identity certificate of the policy manager; then, the access authority validates the AIK certificate of the access requestor according to the certificate verification result, and generates a platform integrity evaluation result by utilizing the platform integrity verification result of the access requestor performed by the access authority; then, the access authority extracts from the TPM a corresponding PCRs value according to a PCRs table requested by the access requestor, and signs in the TPM the corresponding PCRs value extracted from the TPM and the $N_{AR}$ with an AIK private key; finally, the access authority sends the following information to the access requestor:

(a) the message content sent by the policy manager in the step (3.1.4); (b) $N_{AR}$; (c) $N_{AC}$; (d) $PCRs_{AC}$; (e) $Log_{AC}$; (f) the signature, which is signed by the access authority, of the corresponding PCRs value extracted from the TPM and the $N_{AR}$.

In the procedure of generating the platform integrity evaluation result of the access requestor in the step (3.1.5), the access authority may exchange integrity information with the access requestor and perform verification again, i.e., repeat the step (3.1.1) to the step (3.1.6) if the access authority does not satisfy the result or as another network policy requires.

The procedure of validating the AIK certificate and the procedure of additional platform integrity verification of the access authority performed by the access requestor are optional as required.

(3.1.6) On receiving the information sent from the access authority in the step (3.1.5), the access requestor first validates the signature of the policy manager by utilizing a public key corresponding to the identity certificate of the policy manager, then verifies the consistency of $N_{AR}$, validates AIK signature of the access authority by utilizing a public key of the AIK certificate of the access authority, and validates the AIK certificate of the access authority according to a certificate verification result; then, the access requestor verifies the platform integrity of the access authority by utilizing the PCRs value requested from the access authority by the access requestor, the $Log_{AC}$ and the standard integrity measurement value provided in the database, and generates a platform integrity verification result of the access authority; finally, the access requestor generates a platform integrity evaluation result according to the validity of the AIK certificate of the access authority and the platform integrity verification result of the access authority.

In the procedure of generating the platform integrity evaluation result of the access authority in the step (3.1.6), the access requestor may exchange integrity information with the access authority and perform verification again, i.e., repeat the step (3.1.2) to the step (3.1.6) if the access authority does not satisfy the result or as another network policy requires. The procedure of validating the AIK certificate and the procedure of additional platform integrity verification of the access requestor performed by the access authority are optional as required.

Figure 5:
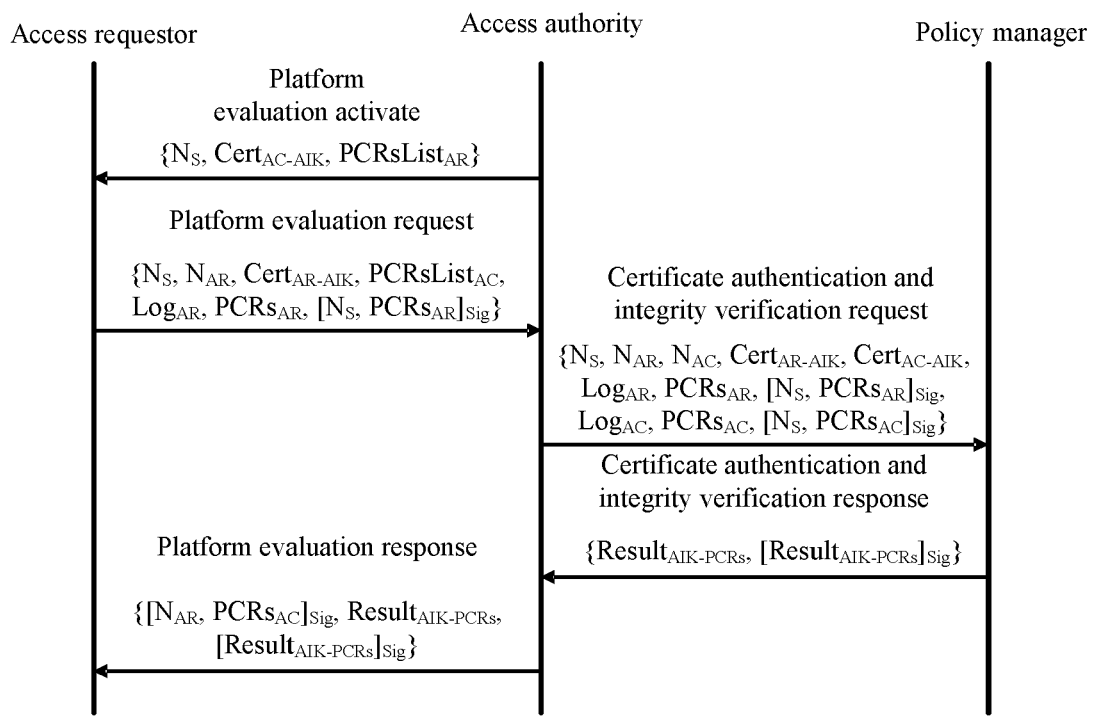
FIG. 5 is a schematic diagram of a second manner of implementing platform integrity evaluation according to the present invention.

Referring to FIG. 5, the second manner of implementing the platform integrity evaluation is described as follows:

(3.2.1) On receiving the user authentication success information sent from the network access authority, the access authority sends the following information to the access requestor:

(a) $N_S$; (b) $Cert_{AC-AIK}$; (c) $PCRsList_{AR}$.

(3.2.2) On receiving the information sent from the access authority in the step (3.2.1), the access requestor first extracts from the TPM a corresponding PCRs value according to the PCRs table requested by the access authority, then signs in the TPM the corresponding PCRs value extrated from the TPM and the $N_S$ by utilizing an AIK private key, and finally sends the following information to the access authority:

(a) $N_S$; (b) $N_{AR}$; (c) $Cert_{AR-AIK}$; (d) $PCRsList_{AC}$; (e) $PCRs_{AR}$; (f) $Log_{AR}$; and (g) the signature, which is signed in the TPM by the access requestor, of the corresponding PCRs value extrated from the TPM and the $N_S$ by utilizing the AIK private key.

(3.2.3) On receiving the information sent from the access requestor in the step (3.2.2), the access authority first instructs the TPM to verify the consistency of $N_S$, then validates the AIK signature of the access requestor by utilizing a public key of the AIK certificate of the access requestor, subsequently extracts from the TPM a corresponding PCRs value according to the PCRs table requested by the access requestor; then, the access authority signs the corresponding PCRs value extracted from the TPM and the $N_{AR}$ in the TPM by utilizing an AIK private key, and finally sends the following information to the policy manager:

(a) $N_S$; (b) $N_{AR}$; (c) $Cert_{AR-AIK}$; (d) $PCRs_{AR}$; (e) $Log_{AR}$; (f) the signature, which is signed in the TPM by the access requestor, of the corresponding PCRs value extracted from the TPM and the $N_S$ by utilizing the AIK private key; (g) $N_{AC}$; (h) $Cert_{AC-AIK}$; (i) $PCRs_{AC}$; (j) $Log_{AC}$; and (k) the signature, which is signed in the TPM by the access authority, of the corresponding PCRs value extracted from the TPM and the $N_{AR}$ by utilizing the AIK private key.

(3.2.4) On receiving the information sent from the access authority in the step (3.2.3), the policy manager first validates the AIK signatures of the access requestor and the access authority by utilizing public keys corresponding to respective AIK certificates of the access requestor and the access authority; then the policy manager re-computes a corresponding PCRs value according to measurement logs of the corresponding PCRs values extracted from the respective TPMs of the access requestor and the access authority as well as the standard integrity measurement value in the database, and compares the re-computed corresponding PCRs value with the corresponding PCRs value in the information sent from the access authority in the step (3.2.3); subsequently, the policy manager generates a $Result_{AIK-PCRs}$, and signs the $Result_{AIK-PCRs}$ by utilizing a private key corresponding to the identity certificate of the policy manager to obtain $[Result_{AIK-PCRs}]_{Sig}$; finally, the policy manager sends the $Result_{AIK-PCRs}$ and the $[Result_{AIK-PCRs}]_{Sig}$ to the access authority. The $Result_{AIK-PCRs}$ includes:

(a) $N_{AC}$; (b) $N_S$; (c) $Cert_{AR-AIK}$; (d) $PCRs_{AR}$; (e) $Re_{AR}$; (f) $N_{AR}$; (g) $Cert_{AC-AIK}$; (h) $PCRs_{AC}$; $Re_{AC}$; (j) $Re_{AR-AIK}$; and (k) $Re_{AC-AIK}$.

(3.2.5) On receiving the information sent from the policy manager in the step (3.2.4), the access authority first verifies the consistency of a $N_{AC}$ and the $N_{AC}$ in the information sent by the policy manager in the step (3.2.4), and validates the user signature of the policy manager; subsequently, the access authority instructs the TPM to verify the consistency of $N_S$ and the consistency of the $Cert_{AR-AIK}$ and the $PCRs_{AR}$. Then, the access authority verifies the $Re_{AR-AIK}$ and the $Re_{AR}$, and generates a platform integrity evaluation result of the access requestor; finally, the access authority sends to the access requestor the information in the step (3.2.4) and the signature of the PCRs value extracted from the TPM and the $N_{AR}$ by the access authority utilizing an AIK private key in the TPM.

In the procedure of generating the platform integrity evaluation result of the access requestor in the step (3.2.5), the access authority may exchange integrity information with the access requestor and perform verification again, i.e., repeat the step (3.2.1) to the step (3.2.6) if the access authority does not satisfy the result or as another network policy requires. The procedure of validating the AIK certificates and the procedure of additional platform integrity verification of the access authority performed by the access requestor are optional as required.

(3.2.6) On receiving the information sent from the access authority in the step (3.2.5), the access requestor first validates the AIK signature of the access authority and the validity of the user signature of the policy manager; then, the access requestor instructs the TPM to verify the consistency of $N_{AR}$; subsequently, the access requestor verifies the consistency of the AIK certificate of the access authority and the PCRs value requested by the access requestor; finally, the access requestor verifies the $Re_{AC-AIK}$ and the $Re_{AC}$, and generates a platform integrity evaluation result of the access requestor.

In the procedure of generating the platform integrity evaluation result of the access authority in the step (3.2.6), the access requestor may exchange integrity information with the access authority and perform verification again, i.e., repeat the step (3.2.2) to the step (3.2.6) if the access requestor does not satisfy the result or as another network policy requires. The procedure of validating the AIK certificate and the procedure of additional platform integrity verification of the access requestor performed by the access authority are optional as required.

(4.) Access control is performed.

The TNC server and the TNC client respectively collect the platform integrity evaluation results of the access authority and the access requestor, and then send recommendations to the network access authority and the network access requestor respectively; the network access requestor and the network access authority control ports according to respectively received recommendations to implement mutual access control between the access requestor and the access authority. The recommendation sent by the TNC server and the TNC client to the network access authority and the network access requestor may be: access permission information, access refusal information or isolation repair information.

In the above embodiments of the present invention, the access control method based on tri-element peer authentication are adopted at the network access layer, which enhances the security of the trusted network connect architecture and simplifies key management of the architecture.

In addition, a manner of implementing the platform integrity evaluation may be selected according to actual situation. In the first manner, the policy manager implements concentrated authentication of AIK certificates of the access requestor and the access authority, and the access requestor and the access authority implement platform integrity verification of the other part locally each other. The first manner is adapted if both the access requestor and the access authority can access a database storing standard integrity measurement values of respective platform components, which can enhance the security of the trusted network connect architecture and simplify key management of the trusted network connect architecture. In the second manner, both authentication of AIK certificates and platform integrity verification of the access requestor and the access authority are accomplished by the policy manager, which simplifies key management and integrity verification mechanisms of the trusted network connect architecture, further enhances the security of the trusted network connect architecture and extenses the application range of the trusted network connect.

In addition, in the present invention, the tri-element peer authentication protocol, i.e., bidirectional authentication protocol based on a third party, is adopted not only at the network access layer to implement bidirectional user authentication between the access requestor and the access authority but also at the integrity evaluation layer to implement bidirectional platform integrity evaluation between the access requestor and the access authority, thereby enhancing the security of the whole trusted network connect architecture.

The trusted network connect method for enhancing security according to the present invention is described in detail as above. Specific examples are listed in the text to illustrate the theory and embodiments of the present invention. The description of the above embodiments is merely of assistance in understanding of the solution of the present invention. Also, those skilled in the art can make modifications to the embodiments and application ranges within the disclosure of the present invention. In conclusion, the description shall not be understood as a limitation to the present invention.

The invention claimed is:

1. A trusted network connect method for enhancing security, comprising:
   (1.) an initiation step:
   (1.1) preparing in advance, by a Trusted Network Connect (TNC) client of an access requestor and a TNC server of an access authority, platform integrity information and providing the platform integrity information to respective Integrity Measurement Collecters (IMCs) of an integrity measurement layer;
   (1.2) pre-specifying, by the TNC client and the TNC server, integrity verification requirements, which include a platform configuration registers (PCRs) table to be requested mutually for verification by the access requestor and the access authority;
   (1.3) hashing, by the Trusted Platform Modules (TPMs) of the access requestor and the access authority, platform information required by network policies, and storing the hashed platform information in Platform Configuration Registers (PCRs);
   (2.) a user authentication:
   (2.1) at a network access layer, initiating, by a network access requestor, an access request to a policy enforcer, which forwards the access request to a network access authority;
   (2.2) initiating, by the network access authority, a bidirectional user authentication procedure on receiving the access request, performing a tri-element peer authentication protocol among the network access requestor, the network access authority and a user authentication service unit of the network access layer to implement bidirectional user authentication and key negotiation between the access requestor and the access authority; then, transmitting, by the network access authority, a primary key generated in the bidirectional user authentication procedure to a policy enforcement point via a pre-established secure channel; finally, utilizing, by the policy enforcement point and the access requestor, the primary key to perform key negotiation;
   (2.3) if the bidirectional user authentication is successful, sending, by the network access requestor and the network access authority, user authentication success information to the TNC client and the TNC server of an integrity evaluation layer,
   (3.) an integrity evaluation step:
   when the TNC server of the access authority receives the user authentication success information sent from the network access authority, utilizing, by the TNC server of the access authority, the TNC client of the access requestor and a platform evaluation service unit of the policy manager, the tri-element peer authentication protocol to implement bidirection platform integrity evaluation between the access requestor and the access authority at the integrity evaluation layer and the integrity measurement layer;
   (4.) an access control step:
   collecting, by the TNC server and the TNC client respectively, platform integrity evaluation results of the access authority and the access requestor, and sending recommendations to the network access authority and the network access requestor respectively; controlling ports according to the received recommendations by the network access requestor and the network access authority respectively to implement mutual access control between the access requestor and the access authority.

2. The trusted network connect method for enhancing security according to claim 1, wherein in the step (3.) utilize utilizing, by the TNC server of the access authority, the TNC client of the access requestor and a platform evaluation service unit of the policy manager, the tri-element peer authentication protocol to implement bidirectional platform integrity evaluation between the access requestor and the access authority, comprises:

verifying the platform integrity of the access authority by the access requestor, and verifying the integrity of the access requestor by the access authority; and validating Attestation Identity Key (AIK) certificates of the access requestor and the access authority by the policy manager.

3. The trusted network connect method for enhancing security according to claim 1, wherein in the step (3.) utilizing, by the TNC server of the access authority, the TNC client of the access requestor and a platform evaluation service unit of the policy manager, the tri-element peer authentication protocol to implement bidirection platform integrity evaluation between the access requestor and the access authority comprises:

(3.1.1) when the TNC server of the access authority receives the user authentication success information sent from the network access authority or the user authentication has been confirmed as successful, sending the following information to the access requestor by the access authority:
(a) a random number generated by TPM of the access authority ($N_S$);
(b) an AIK certificate of the access authority ($Cert_{AC-AIK}$); and
(c) a PCRs table requested from the access requestor by the access authority ($PCRsList_{AR}$);

(3.1.2) on receiving the information sent from the access authority in the step (3.1.1), extracting, by the access requestor, from the TPM a corresponding PCRs value according to the PCRs table requested by the access authority, signing the corresponding PCRs value extracted from the TPM and the $N_S$ in the TPM by utilizing an AIK private key, and sending the following information to the access authority:
(a) a random number generated by TPM of the access authority ($N_S$);
(b) a random number generated by TPM of the access requestor ($N_{AR}$);
(c) an AIK certificate of the access requestor ($Cert_{AR-AIK}$);
(d) a PCRs table requested from the access authority by the access requestor ($PCRsList_{AC}$);
(e) a PCRs value requested by the access authority ($PCRs_{AR}$);
(f) a measurement log of the PCRs value requested by the access authority ($Log_{AR}$); and
(g) a signature, which is signed by the access requestor in the TPM, of the corresponding PCRs value extracted from the TPM and the $N_S$ by utilizing the AIK private key;

(3.1.3) on receiving the information sent from the access requestor in the step (3.1.2), instructing, by the access authority, the TPM to verify the consistency of the random numbers generated by the TPM of the access authority ($N_S$), then validating the AIK signature of the access requestor by utilizing a public key of the AIK certificate of the access requestor, verifying platform integrity of the access requestor by utilizing the PCRs value requested from the access requestor by the access authority, the $Log_{AR}$ and a standard integrity measurement value provided in a database, generating a platform integrity verification result of the access requestor by the access authority, and sending the following information to the policy manager:
(a) a random number generated by TPM of the access requestor ($N_{AR}$);
(b) a random number generated by an access authority user ($N_{AC}$);
(c) the AIK certificate of the access requestor; and
(d) the AIK certificate of the access authority;

(3.1.4) on receiving the information sent from the access authority in the step (3.1.3), verifying, by the policy manager, the AIK certificates of the access requestor and the access authority, and generating a result of verification of certificates of the access requestor and the access authority ($Result_{AIK}$), the $Result_{AIK}$ comprising the $N_{AC}$, the $Cert_{AR-AIK}$, a result of verification of the AIK certificate of the access requestor ($Re_{AR-AIK}$), a random number generated by TPM of the access requestor ($N_{AR}$), the $Cert_{AC-AIK}$, a result of verification of the AIK certificate of the access authority ($Re_{AC-AIK}$); signing, by the policy manager, the $Result_{AIK}$ by utilizing a private key corresponding to the identity certificate of the policy manager; sending, by the policy manager, the generated $Result_{AIK}$ and the sigature $[Result_{AIK}]_{Sig}$ of the $Result_{AIK}$ to the access authority;

(3.1.5) on receiving the information sent from the policy manager in the step (3.1.4), verifying, by the access authority, the consistency of the random numbers generated by an access authority user ($N_{AC}$) and the random numbers generated by TPM of the access requestor ($N_{AR}$), and validating the signature of the policy manager by utilizing a public key corresponding to the identity certificate of the policy manager; validating, by the access authority, the AIK certificate of the access requestor according to the certificate verification result, and generating a platform integrity evaluation result by utilizing the platform integrity verification result of the access requestor performed by the access authority; extracting, by the access authority, from the TPM a corresponding PCRs value according to the PCRs table requested by the access requestor, and signing in the TPM the corresponding PCRs value extracted from the TPM and the $N_{AR}$ by utilizing an AIK private key; sending, by the access authority, the following information to the access requestor:
(a) a message content sent by the policy manager in the step (3.1.4);
(b) a random number generated by TPM of the access requestor ($N_{AR}$);
(c) a random number generated by an access authority user ($N_{AC}$);
(d) the PCRs value requested by the access requestor ($PCRs_{AC}$);
(e) a measurement log of the PCRs value requested by the access requestor ($Log_{AC}$); and
(f) the signature, which is signed by the access authority, of the corresponding PCRs value extracted from the TPM and the $N_{AR}$;

(3.1.6) on receiving the information sent from the access authority in the step (3.1.5), validating, by the access requestor, the signature of the policy manager by utilizing a public key corresponding to the identity certificate of the policy manager, verifying the consistency of the random numbers generated by TPM of the access requestor ($N_{AR}$), validating the AIK signature of the access authority by utilizing a public key of the AIK certificate of the access authority, and validating the AIK certificate of the access authority according to a certificate verification result; verifying, by the access requestor, the platform integrity of the access authority by utilizing the PCRs value requested from the access authority by the access requestor, the $Log_{AC}$ and the standard integrity measurement value provided in the database, and generating a platform integrity verification result of the access authority; generating, by the access requestor, a platform integrity evaluation result according to the validity of the AIK certificate of the access authority and the platform integrity verification result of the access authority.

4. The trusted network connect method for enhancing security according to claim 3, wherein in the procedure of generating the platform integrity evaluation result of the access requestor in the step (3.1.5), the method further comprises exchanging, by the access authority, integrity information with the access requestor by repeating the step (3.1.1) to the step (3.1.6).

5. The trusted network connect method for enhancing security according to claim 3, wherein in the procedure of generating the platform integrity evaluation result of the access authority in the step (3.1.6), the method further comprises exchanging, by the access requestor, integrity information with the access authority by repeating the step (3.1.2) to the step (3.1.6).

6. The trusted network connect method for enhancing security according to claim 1, wherein in the step (3.) utilizing, by the TNC server of the access authority, the TNC client of the access requestor and a platform evaluation service unit of the policy manager, the tri-element peer authentication protocol to implement bidirectional platform integrity evaluation between the access requestor and the access authority comprises:
  verifying the platform integrity of the access requestor and the access authority by the policy manager; and
  validating AIK certificates of the access requestor and the access authority by the policy manager.

7. The trusted network connect method for enhancing security according to claim 1, wherein in the step (3.) utilizing the tri-element peer authentication protocol by the TNC server of the access authority, the TNC client of the access requestor and a platform evaluation service unit of the policy manager to implement bidirectional platform integrity evaluation between the access requestor and the access authority comprises:
  (3.2.1) on receiving the user authentication success information sent from the network access authority, sending, by the access authority, the following information to the access requestor:
  (a) a random number generated by TPM of the access authority ($N_S$);
  (b) an AIK certificate of the access authority ($Cert_{AC-AIK}$); and
  (c) a PCRs table requested from the access requestor by the access authority ($PCRsList_{AR}$);
  (3.2.2) on receiving the information sent from the access authority in the step (3.2.1), extracting, by the access requestor, from the TPM a corresponding PCRs value according to the PCRs table requested by the access authority, signing in the TPM the corresponding PCRs value extracted from the TPM and the $N_S$ by utilizing an AIK private key, and sending the following information to the access authority:
  (a) a random number generated by TPM of the access authority ($N_S$);
  (b) a random number generated by TPM of the access requestor ($N_{AR}$);
  (c) an AIK certificate of the access requestor ($Cert_{AR-AIK}$);
  (d) a PCRs table requested from the access authority by the access requestor ($PCRsList_{AC}$);
  (e) a PCRs value requested by the access authority ($PCRs_{AR}$);
  (f) a measurement log of the PCRs value requested by the access authority ($Log_{AR}$); and
  (g) a signature, which is signed by the access requestor in the TPM, of the corresponding PCRs value extracted from the TPM and the $N_S$ by utilizing the AIK private key;
  (3.2.3) on receiving the information sent from the access requestor in the step (3.2.2), instructing, by the access authority, the TPM to verify the consistency of the random numbers generated by the TPM of the access authority ($N_S$), validating the AIK signature of the access requestor by utilizing a public key of the AIK certificate of the access requestor, and extracting from the TPM a corresponding PCRs value according to the PCRs table requested by the access requestor; signing, by the access authority, the corresponding PCRs value extracted from the TPM and the $N_{AR}$ in the TPM by utilizing an AIK private key, and sends the following information to the policy manager:
  (a) a random number generated by TPM of the access authority ($N_S$);
  (b) a random number generated by TPM of the access requestor ($N_{AR}$);
  (c) the AIK certificate of the access requestor ($Cert_{AR-AIK}$);
  (d) the PCRs value requested by the access authority ($PCRs_{AR}$);
  (e) the measurement log of the PCRs value requested by the access authority ($Log_{AR}$);
  (f) the signature, which is signed in the TPM by the access requestor, of the corresponding PCRs value extracted from the TPM and the $N_S$ by utilizing the AIK private key;
  (g) a random number generated by an access authority user ($N_{AC}$);
  (h) the AIK certificate of the access authority ($Cert_{AC-AIK}$);
  (i) a PCRs value requested by the access requestor ($PCRs_{AC}$);
  (j) a measurement log of the PCRs value requested by the access requestor ($Log_{AC}$); and
  (k) the signature, which is signed in the TPM by the access authority, of the corresponding PCRs value extracted from the TPM and the $N_{AR}$ by utilizing the AIK private key;
  (3.2.4) on receiving the information sent from the access authority in the step (3.2.3), validating, by the policy manager, the AIK signatures of the access requestor and the access authority by utilizing public keys corresponding to respective AIK certificates of the access requestor and the access authority; re-computing, by the policy manager, a corresponding PCRs value according to the measurement logs of the corresponding PCRs values extracted from the respective TPMs of the access requestor and the access authority as well as a standard integrity measurement value in a database, and comparing the re-computed corresponding PCRs value with the corresponding PCRs value in the information sent from the access authority in the step (3.2.3); generates generating, by the policy manager, a result of AIK certificate authentication and integrity verification of the access requestor and the access authority ($Result_{AIK-PCRs}$), and signing the $Result_{AIK-PCRs}$ by utilizing a private key corresponding to the identity certificate of the policy manager to obtain a $[Result_{AIK-PCRs}]_{Sig}$; sending, by the policy manager, the $Result_{AIK-PCRs}$ and the $[Result_{AIK-PCRs}]_{Sig}$ to the access authority, the $Result_{AIK-PCRs}$ comprising:

(a) a random number generated by the access authority user ($N_{AC}$);
(b) a random number generated by TPM of the access authority ($N_S$);
(c) the AIK certificate of the access requestor ($Cert_{AR\text{-}AIK}$);
(d) the PCRs value requested by the access authority ($PCRs_{AR}$);
(e) a result of platform integrity verification of the access requestor ($Re_{AR}$);
(f) a random number generated by TPM of the access requestor ($N_{AR}$);
(g) the AIK certificate of the access authority ($Cert_{AC\text{-}AIK}$);
(h) the PCRs value requested by the access requestor ($PCRs_{AC}$);
(i) a result of platform integrity verification of the access authority ($Re_{AC}$);
(j) a result of verification of AIK certificate of the access requestor ($Re_{AR\text{-}AIK}$); and
(k) a result of verification of AIK certificate of the access authority ($Re_{AC\text{-}AIK}$);
(3.2.5) on receiving the information sent from the policy manager in the step (3.2.4), verifying, by the access authority, the consistency of a random number generated by the access authority user ($N_{AC}$) and the $N_{AC}$ in the information sent by the policy manager in the step (3.2.4), and validating the user signature of the policy manager; instructing, by the access authority, the TPM to verify the consistency of the random numbers generated by TPM of the access authority ($N_S$), the consistency of the AIK certificates of the access requestor ($Cert_{AR\text{-}AIK}$) and the consistency of the PCRs values requested by the access authority ($PCRs_{AR}$); verifying, by the access authority, the $Re_{AR\text{-}AIK}$ and the $Re_{AR}$, and generating a platform integrity evaluation result of the access requestor; sending, by the access authority, to the access requestor the information in the step (3.2.4) and the signature of the PCRs value extracted from the TPM and the $N_{AR}$ by the access authority utilizing an AIK private key in the TPM;

(3.2.6) on receiving the information sent from the access authority in the step (3.2.5), validating, by the access requestor, the AIK signature of the access authority and the validity of the user signature of the policy manager; instructing, by the access requestor, the TPM to verify the consistency of the random numbers generated by TPM of the access requestor ($N_{AR}$); verifying, by the access requestor, the consistency of the AIK certificate of the access authority and the PCRs value requested by the access requestor; verifying, by the access requestor, the $Re_{AC\text{-}AIK}$ and the $Re_{AC}$, and generates a platform integrity evaluation result of the access requestor.

8. The trusted network connect method for enhancing security according to claim 7, wherein
in the procedure of generating the platform integrity evaluation result of the access requestor in the step (3.2.5), the access authority exchanges integrity information with the access requestor again by repeating the step (3.2.1) to the step (3.2.6).

9. The trusted network connect method for enhancing security according to claim 7, wherein
in the procedure of generating the platform integrity evaluation result of the access authority in the step (3.2.6), the access requestor exchanges integrity information with the access authority again by repeating the step (3.2.2) to the step (3.2.6).

10. The trusted network connect method for enhancing security according to claim 1, wherein the recommendation sent by the TNC server and the TNC client to the network access authority and the network access requestor comprises: access permission information, access refusal information and isolation repair information.

* * * * *